Jan. 2, 1923. 1,440,559

W. H. SHARPE.
METHOD OF MAKING SPLIT BUSHINGS FOR BEARINGS.
FILED AUG. 28, 1920.

Fig.1ª.

Inventor:
William H. Sharpe
by
Thurston, Kwis & Hudson
attys.

Patented Jan. 2, 1923.

1,440,559

UNITED STATES PATENT OFFICE.

WILLIAM H. SHARPE, OF LAKEWOOD, OHIO.

METHOD OF MAKING SPLIT BUSHINGS FOR BEARINGS.

Application filed August 28, 1920. Serial No. 406,624.

*To all whom it may concern:*

Be it known that I, WILLIAM H. SHARPE, a citizen of the United States, residing at Lakewood, in the county of Cuyahoga and State of Ohio, have invented a certain new and useful Improvement in Methods of Making Split Bushings for Bearings, of which the following is a full, clear, and exact description.

The present invention relates to a split bearing bushing in which, when the halves are assembled, the interior surface is a true cylindrical surface, and the invention further relates to a method by which such a bearing bushing may be economically made.

Figure 1:
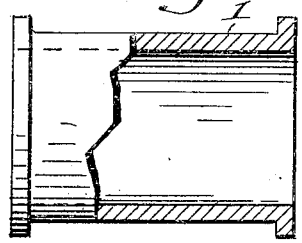
Figure 2:
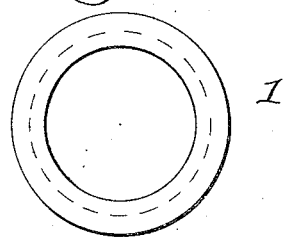
Figure 2:
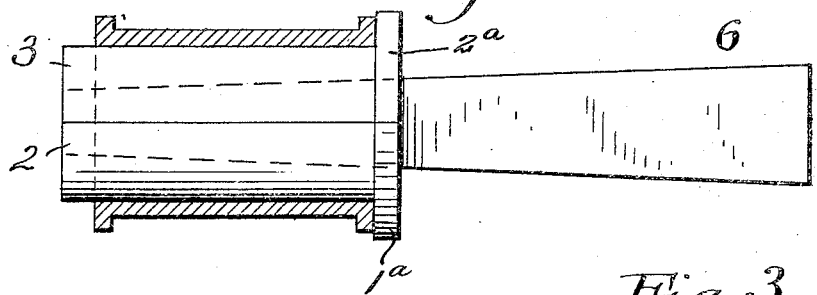
Figure 5:
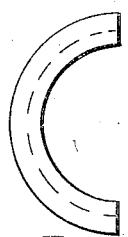
Figure 4:
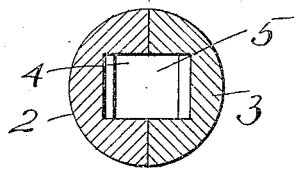
Figure 3:
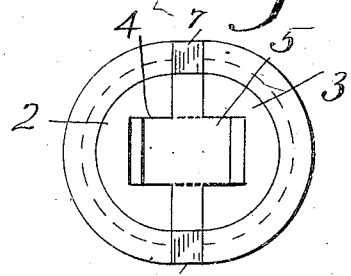

Reference should be had to the accompanying drawings forming a part of the specification in which Fig. 1 is an elevation with parts in section of a cylindrical bushing; Fig. 1ª is an end elevation of Fig. 1; Fig. 2 is an elevation with portions in section of a bushing with expanding apparatus associated therewith; Fig. 3 is an elevation showing in an exaggerated degree a stretched bushing; Fig. 4 is a sectional elevation of an expanding member; Fig. 5 is an end elevation of one of the sections of the bushing.

It is usual practice in the making of bearings, to provide a bushing made in two halves, the interior surface of the two halves being babbitted and the bushings assembled inside of a bearing standard and a bearing cap, the cap being fastened to the standard by suitable bolts.

The usual practice in making the bearing bushings is to take a cylindrical bushing and cut it into two equal parts, and it follows that if the bushing before being cut had a true interior cylindrical surface, the two halves, after the cutting operation, would not when assembled have a true cylindrical surface, because the cutting operation would necessarily have removed some metal and thus the interior diameter of the assembled halves would not be uniform.

When such bushings are assembled with respect to the bearing members, it is necessary to fasten the bushing to the bearing standard and cap, because the bushings when assembled, not having a true cylindrical surface, have a tendency to turn with the shaft which is mounted in the bushing.

Furthermore if the original bushing before being cut was of the proper diameter when babbitted to receive the shaft which it was intended to accommodate, after cutting it has been customary to place shims between the base member of the bearing and the cap member in order to make up for the deficiency of the bushing because of the metal removed in the cutting operation. This entails a considerable amount of labor in the matter of lining up a shaft as well as producing a job which is not entirely satisfactory.

It is the purpose of the present invention to provide a split bushing which is of the same internal diameter after being severed or cut as it was before the cutting operation was effected.

The underlying principle of the method by which this is accomplished lies in stretching the tubular bushing before severing in a manner to produce a circumferential stretch of the metal a sufficient amount to compensate for the amount of metal removed by the cutting operation.

In proceeding we may assume that we have a true cylindrical bushing 1, such as shown in Figure 1. In other words, a double bushing which has been reamed to the proper diameter, which it is desired that the final split bushing shall have. Into the bushing there is introduced two semi-cylindrical members such as indicated at 2 and 3. These semi-cylindrical members being formed of hardened steel or other suitable material, and the diameter of the assembled parts 1 and 2 is such as to snugly fit within the tubular bushing. Each of the members 2 and 3, at their contacting surfaces, is formed with a groove such as indicated at 4 and 5, these grooves have a slight taper from one end to the other, that is to say, a slight taper with respect to their depth.

Preferably each of the members 2 and 3 is at one end formed with a flange 1ª and 2ª, which engages with an end of the bushing so that in subsequent operations the expanding members 2 and 3 will not slip through the bushing.

A wedge member 6 is provided which is suitably tapered to cooperate with the grooves or recesses 4 and 5, and when this member 6 is introduced into the wedges and pressure exerted on the member 6, while holding the bushing 3 in any suitable manner. The member 6 pushes the expanding members 2 and 3 apart and stretches the bushing in a circumferential manner so that the bushing assumes what we may term a slightly elliptical shape, such as indicated in Figure 3. The pressure on the member 5 is produced to the extent necessary to provide a circumferential stretch of the bushing of an amount which is substantially equal to the width of the saw or other cutting tool which is used to sever the bushing. This may be in the neighborhood of 25 to 30 thousandths of an inch.

With the bushing in this expanded condition the cutting tools are applied to the bushing at substantially the points 7 and 8 as indicated in the Figure 3, and it is found at the conclusion of the cutting process that the stretching produced has compensated for the amount of metal removed during the cutting operation, so that the two halves of the bushing, when brought together, have a true cylindrical surface which is of uniform diameter.

While in this description a specific way has been disclosed of deforming the bushing for the purpose of cutting the same into two halves, it is understood that the invention is not limited to a particular apparatus which is described. But any apparatus which will produce the desired stretch and deformation of the bushing, as explained, may be used.

Having thus described my invention I claim:—

1. The method of forming a split bushing which consists in taking a cylindrical integral bushing, deforming the bushing by internal pressure to a substantial elliptical shape and severing the bushing at diametrical opposite portions of the bushing at the end of the shortest diameter when deformed.

2. The method of forming a split bushing which consists in taking an integral bushing of uniform internal diameter, producing pressure within the bushing to stretch the bushing in a diametrical direction and cutting the bushing at opposite points of the bushing and at extremes of the shortest diameter, the while in stretched condition.

3. The method of forming a split bushing which consists in taking an integral bushing of uniform internal diameter, stretching the metal circumferentially an amount sufficient to compensate for the metal removed in the cutting operation while splitting the same, and cutting the bushing at diametrically opposite points while the bushing is in its stretched condition.

In testimony whereof, I hereunto affix my signature.

WILLIAM H. SHARPE.